United States Patent Office 3,527,801
Patented Sept. 8, 1970

---

3,527,801
6-AMINO-N-(2-[(2-DIALKOXYALKYL)AMINO]ETH-YL)-BENZENESULFONAMIDES
Peter H. L. Wei, Upper Darby, and Stanley C. Bell, Penn Valley, Pa., assignors to American Home Products Corporation, New York, N.Y., a corporation of Delaware
No Drawing. Continuation-in-part of application Ser. No. 533,856, Mar. 14, 1966. This application Mar. 15, 1968, Ser. No. 713,300
Int. Cl. C07c *143/80*
U.S. Cl. 260—556     11 Claims

ABSTRACT OF THE DISCLOSURE

6 - amino - N-(2-[(2-dialkoxyalkyl)amino]ethyl)-benzenesulfonamides (I) are prepared by condensing the corresponding 6 - amino - N-(2-bromoethyl)benzenesulfonamide and a dialkyl aminoacetaldehyde acetal in the presence of a base. Compounds (I) are pharmacologically active, especially as central nervous system depressant agents.

---

This application is a continuation-in-part of copending application Ser. No. 533,856, filed Mar. 14, 1966, and now abandoned.

This invention relates to new and useful benzenesulfonamides having pharmacological activity.

DESCRIPTION OF THE INVENTION

The novel compounds which are included within the scope of this invention are represented by Formula I:

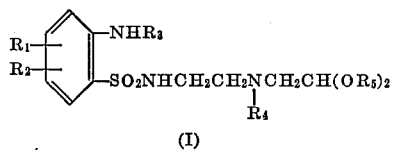

(I)

wherein $R_1$ and $R_2$ are hydrogen, sulfamoyl, halogen or lower alkyl; $R_3$ and $R_4$ are hydrogen, lower alkyl, phenyl, lower alkylphenyl or halophenyl; and
$R_5$ is lower alkyl.

Illustrative of such compounds are:

6-amino-4-chloro-N-(2-[(2-diethoxyethyl)methylamino] ethyl)-m-toluenesulfonamide;
6-amino-4-chloro-N-(2-[(2-diethoxyethyl)-amino] ethyl)-m-toluenesulfonamide; and
6-anilino-4-chloro-N-(2-[(2-diethoxyethyl)phenylamino] ethyl)benzenesulfonamide.

The novel compounds of the present invention may be prepared by the process generally illustrated by the following equation:

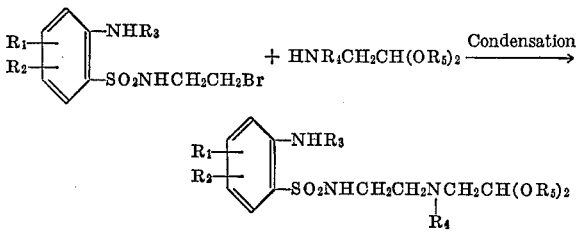

wherein $R_1$, $R_2$, $R_3$, $R_4$ and $R_5$ are as defined above. In practising the process outlined above, the compounds of this invention are prepared by refluxing a substantially equimolar mixture of a 6-amino-N-(2-bromoethyl)benzenesulfonamide and a dialkyl aminoacetaldehyde acetal in an inert, water-immiscible, organic solvent in the presence of an alkali metal or alkaline earth metal carbonate for a period of from about three to ten hours. Preferably this reaction is conducted in benzene, chloroform or carbon tetrachloride, in the presence of sodium or potassium carbonate for a period of about six hours.

After the reaction period, the mixture is cooled, the insoluble material removed by filtration, the organic layer washed with water and then evaporated. Thereafter, the residue is recrystallized from an alkanol to yield the desired 6 - amino-N-(2-[(2-dialkoxyalkyl)amino]ethyl)benzenesulfonamide.

The term "lower alkyl" contemplates straight and branched chain hydrocarbon groups of from about 1 to about 6 carbon atoms. The term "halogen" and derivations thereof includes chlorine, bromine, iodine and fluorine.

Many of the reactants employed in the process of this invention, such as the dialkyl aminoacetaldehyde acetals, are known compounds which are readily available from commercial sources while the remainder can easily be prepared in accord with standard procedures well known to those skilled in the art. The 6-amino-N-(2-bromoethyl)benzenesulfonamides may be prepared by the interaction of a 6-aminobenzenesulfonyl chloride with a 2-bromoethylamine. This reaction is described in copending U.S. patent application, Ser. No. 533,807 "1,2,5-Benzothiadiazepine 1,1-Dioxides," filed by Peter H. L. Wei and Stanley C. Bell on Mar. 14, 1966, and now U.S. Pat. No. 3,453,266.

The compounds of Formula I of this invention have demonstrated pharmacological activity. In particular they have been found to exert a depressant action on the central nervous system when tested under standard and accepted pharmacological procedures in animals, such as mice and rats. They are, therefore, deemed to possess utility in experimental and comparative pharmacology and are of value to treat conditions in animals, such as valuable domestic animals, and in laboratory animals, such as mice, rats and the like, responsive to treatment with central nervous system depressants, such as the need to induce a calming effect.

When used pharmacologically, the compounds of Formula I of this invention may be administered either alone or in combination with other pharmacologically-active ingredients. Whether singly or in combination, they may be used in the form of solid compositions combined, if desired, with extenders or carriers that are relatively non-toxic or inert. They may be put into tablet, capsule or powder form. On the other hand, they may be administered in liquid form as a suspension or solution in a suitable vehicle for parenteral use. As will be shown hereinafter, useful pharmacological action as central nervous system depressant agents in mice will be achieved if the active ingredient is supplied at dosages of 40 mg./kg. and 400 mg./kg.

DESCRIPTION OF THE PREFERRED EMBODIMENT

The following examples are given by way of illustration and are not to be construed as limitations of this invention, many variations of which are possible without departing from the scope and spirit thereof.

EXAMPLE I

6 - amino - N - (2 - bromoethyl) - 4 - chloro-m-toluenesulfonamide (19.3 g., 0.06 m.) and diethyl N-methyl-amino-acetaldehyde acetal (12.0 g., 0.08 m.) are heated to reflux for six hours in the presence of 11.0 g. (0.08 m.) of anhydrous $K_2CO_3$ in a benzene solution. Thereafter, the insoluble material is filtered, the benzene solution washed with water, dried over anhydrous $MgSO_4$ and then the benzene is removed. The crude residue (18 g.) is recrystallized from ethanol to yield 6-amino-4-chloro-N-

(2 - [(2 - diethoxyethyl)methylamino]ethyl)-m-toluene-sulfonamide, M.P. 70–71° C.

*Analysis.*—Calc'd for $C_{16}H_{28}ClN_3O_4S$ (percent): C, 48.75; H, 7.16; Cl, 9.02; N, 10.65; S, 8.16. Found (percent): C, 48.54; H, 7.03; Cl, 9.30; N, 10.75; S, 8.00.

Similarly, 6 - amino-4-bromo-N-(2-[(2-diethoxyethyl)-propylamino]ethyl)-m-toluenesulfonamide and 6-amino-4,5 - dichloro-N-(2-[(2-diethoxyethyl)amino]ethyl)-m-toluenesulfonamide are obtained.

EXAMPLE II

6 - amino - N - (2 - bromoethyl) - 4 - chloro - m - toluenesulfonamide (23 g., 0.07 m.) and diethyl aminoacetaldehyde acetal (11.3 g. or 0.085 m.) are heated to reflux for six hours, in a benzene solution in the presence of anhydrous $K_2CO_3$ (7.0 g., 0.05 m.). The benzene solution is decanted from the solid, washed with water and dried over anhydrous $MgSO_4$. The benzene is then removed having 22 g. of an oily residue which is recrystallized from methanol to yield 6-amino-4-chloro-N-(2-[(2-diethoxyethyl)amino]ethyl)-m-toluenesulfonamide.

In the same manner, 6-amino-N-(2-[(2-dimethoxyethyl)amino]ethyl)-m-toluenesulfonamide is produced.

EXAMPLE III

6 - N - methylamino - N - (2 - bromoethyl)-3-chloro-p-toluenesulfonamide (0.06 m.) and diethyl N-methylaminoacetaldehyde acetal (0.08 m.) are heated to reflux for four hours in the presence of anhydrous $K_2CO_3$ (0.08 m.) in a chloroform solution. Subsequently, the insoluble material is filtered, the chloroform solution washed with water, dried over anhydrous $MgSO_4$, and the chloroform removed. The crude residue is then recrystallized from ethanol to yield 3-chloro-N-(2-[(2-diethoxyethyl)methylamino]ethyl) - 6 - N - methylamino-p-toluenesulfonamide.

Similarly by reacting 3-bromo-6-N-ethylamino-N-(2-bromoethyl)-p-toluenesulfonamide with dipropyl N-ethylaminoacetaldehyde acetal, there is obtained 3-bromo-6-N - ethylamino - N - (2 - [(2 - dipropoxyethyl)ethylamino]ethyl)-p-toluenesulfonamide.

EXAMPLE IV

6 - anilino-N-(2-bromoethyl)-4-chlorobenzenesulfonamide (0.06 m.) and diethyl N-phenylaminoacetaldehyde acetal (0.08 m.) are heated to reflux for ten hours in the presence of 11.0 g. (0.08 m.) of anhydrous $Na_2CO_3$ in a benzene solution. The insoluble material is filtered off, the benzene solution is washed with water, dried over anhydrous $MgSO_4$ and the benzene removed to leave a crude residue. The crude material is recrystallized from methanol to yield 6-anilino-4-chloro-N-(2-[(2-diethyoxyethyl)phenylamino]ethyl)-benzenesulfonamide.

In a similar manner, 6 - (p-chloroanilino)-N-(2-[(2-diethoxyethyl) - p - tolylamino]ethyl) - benzenesulfonamide is obtained.

EXAMPLE V

Repeating the procedure of Examples I to IV to react the following N-(2-bromoethyl)-sulfonamides and aminoacetaldehyde acetals, the hereinafter listed products are obtained:

| Reactants | Products |
| --- | --- |
| 6-amino-N-(2-bromoethyl)-4-methyl-m-toluenesulfonamide and dimethyl N-(p-chlorophenylamino) acetaldehyde acetal. | 6-amino-N-(2[(2-dimethoxy-ethyl)-p-chlorophenylamino] ethyl)-4-methyl-m-toluene-sulfonamide. |
| 6-amino-N-(2-bromoethyl)-5-ethyl-m-toluenesulfonamide and dibutyl N-propylaminoacetaldehyde acetal. | 6-amino-5-ethyl-N-(2-[(2-dibutoxyethyl)-propylamino]ethyl)-m-toluenesulfonamide. |
| 6-amino-N-(2-bromoethyl)-4-iodobenzenesulfonamide and diethyl N-(m-ethyl-phenyl-amino)acetaldehyde acetal. | 6-amino-N-(2-[(2-diethoxyethyl)-m-ethylphenylamino] ethyl)-4-iodobenzenesulfonamide. |
| N-(2-bromoethyl)-6-(p-ethylanilino)-benzenesulfonamide and diethyl N-methylaminoacetaldehyde acetal. | N-(2-[(2-diethoxyethyl)methyl-amino]ethyl)-6-)p-ethylanilino)-benzenesulfonamide. |
| N-(2-bromoethyl)-6-(p-bromoanilino)-benzene-sulfonamide and dimethyl N-(p-bromophenylamino) acetaldehyde acetal. | 6-(p-bromoanilino)-N-(2-[(2-dimethoxy-ethyl)-p-bromophenyl-amino]ethyl)-benzenesulfonamide. |
| 6-amino-N-(2-bromoethyl)-3-propyl-benzenesulfonamide and diethyl N-(p-iodophenyl-amino)-acetaldehyde acetal. | 6-amino-N-(2-[(2-diethoxyethyl)-p-iodophenylamino]ethyl)-3-propyl-benzenesulfonamide. |

EXAMPLE VI

N - (2 - bromoethyl) - 6 - N - butylamino - 3 - fluoro-p-toluenesulfonamide (0.12 m.) and diethyl N-methylaminoacetaldehyde acetal (0.16 m.) are heated to reflux in carbon tetrachloride for ten hours in the presence of anhydrous $Na_2CO_3$ (0.16 m.). Thereafter, the insoluble material is removed by filtration, the carbon tetrachloride solution washed with water, dried over $MgSO_4$ and then evaporated to dryness. The residue is recrystallized from methanol to give 6 - N - butylamino-N-(2-[(2-diethoxyethyl)methylamino]ethyl) - 3 - fluoro-p-toluenesulfonamide.

In a similar manner, N-(2-[(2-dimethoxyethyl)methylamino]ethyl) - 6 - (p-methylanilino)-benzenesulfonamide and 6 - amino - N - (2 - [(2 - diethoxyethyl)-p-bromophenylamino]ethyl)benzenesulfonamide are produced.

EXAMPLE VII 6-amino - N - (2 - bromoethyl)-4-chloro-3-sulfamoyl-benzenesulfonamide (0.10 m.) and diethyl N-methylaminoacetaldehyde acetal (0.14 m.) are heated to reflux for six hours in the presence of anhydrous $K_2CO_3$ (0.14 m.) in a benzene solution. Thereafter the insoluble material is filtered, the benzene solution washed with water, dried over anhydrous $MgSO_4$ and then the benzene is removed. The crude residue is recrysallized from ethanol to yield 6-amino-4-chloro-N-2-[(2-diethoxyethyl)methylamino]ethyl)-3-sulfamoyl-benzenesulfonamide.

In evaluating the instant compounds for pharmacological activity, they are tested in vivo by standard methods with the following results.

The compound is administered to three mice (CF-1, 14 to 24 grams) at each of the following doses: 400, 127, 40 and 12.7 mg./kg.

The animals are watched for signs of general stimulation, general depression and automonic activity and the observations are evaluated by methods described in detail in Turner, Screening Methods in Pharmacology, Academic Press, New York, p. 80 (1965), in the section entitled "A Test Group for Central Depressants." The animals also are rated by use of a pole climb and inclined screen for the presence of sedation-ataxia.

In these tests, 6-amino-4-chloro-N-(2-[2-diethoxyethyl)-methylamino]ethyl) - m - toluenesulfonamide, administered orally as a 1% suspension emulsified with polyethylene oxide sorbitan monooleate, caused decreased motor activity at 40 mg./kg. and decreased respiration at 400 mg./kg. At 400 mg./kg. the sedative-ataxic score was 1–2.

There were no deaths at the highest dose used, 400 mg./kg.

What is claimed is:
1. A compound of the formula:

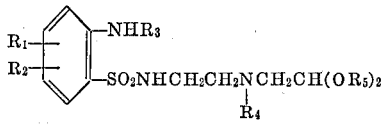

wherein
$R_1$ and $R_2$ are hydrogen, sulfamoyl, halogen or lower alkyl;
$R_3$ and $R_4$ are hydrogen, lower alkyl, phenyl, lower alkylphenyl or halophenyl; and
$R_5$ is lower alkyl.

2. A compound as described in claim 1 which is: 6-amino - 4 - chloro - N - (2 - [(2 - diethoxyethyl)methylamino]ethyl)-m-toluenesulfonamide.

3. A compound as described in claim 1 which is: 6 - amino - 4 - chloro - N - (2 - [(2-diethoxyethyl)amino]ethyl)-m-toluenesulfonamide.

4. A compound as described in claim 1 which is: 6-anilino - 4 - chloro-N-(2-[(2-diethoxyethyl)phenylamino]ethyl)-benzenesulfonamide.

5. A compound as described in claim 1 which is: 6-amino - N - (2 - [(2-dimethoxyethyl)-p-chlorophenylamino]ethyl)-4-methyl-m-toluenesulfonamide.

6. A compound as described in claim 1 which is: 6-amino - 5 - ethyl - N - (2-[(2-dibutoxyethyl)-propylamino]ethyl)-m-toluenesulfonamide.

7. A compound as described in claim 1 which is: 6-amino-N - (2 - [(2-diethoxyethyl)-m-ethylphenylamino]ethyl)-4-iodobenzenesulfonamide.

8. A compound as described in claim 1 which is: N-(2 - [(2 - diethoxyethyl)methylamino]ethyl)-6-(p-ethylanilino) benzenesulfonamide.

9. A compound as described in claim 1 which is: 6-amino - 4 - bromo - N - (2-[(2-diethoxyethyl)propylamino]ethyl)-m-toluenesulfonamide.

10. A compound as described in claim 1 which is: 6-amino - 4,5 - dichloro - N - (2-[(2-diethoxyethyl)amino]ethyl)-m-toluenesulfonamide.

11. A compound as described in claim 1 which is: 6-amino - 4 - chloro - N - (2-[(2-diethoxyethyl)methylamino]ethyl)-3-sulfamoylbenzenesulfonamide.

References Cited

UNITED STATES PATENTS 3,277,086   10/1966   Wei et al. _____ 260—243

HENRY R. JILES, Primary Examiner

S. D. WINTERS, Assistant Examiner

U.S. Cl. X.R.

260—397.7, 573, 584; 424—321